Jan. 15, 1957  C. S. DOLL ET AL  2,777,350
MACHINE TOOL CONTROL APPARATUS
Filed Nov. 28, 1951  3 Sheets-Sheet 1

INVENTOR.
CLAUDE S. DOLL
CLAUDE E. GREENE
BY WAYNE B. AILES

INVENTOR.
CLAUDE S. DOLL
CLAUDE E. GREENE
WAYNE B. AILES

United States Patent Office 2,777,350
Patented Jan. 15, 1957

2,777,350

MACHINE TOOL CONTROL APPARATUS

Claude S. Doll and Claude E. Greene, Sidney, and Wayne B. Ailes, Pemberton, Ohio, assignors to The Monarch Machine Tool Company Application November 28, 1951, Serial No. 258,632

9 Claims. (Cl. 82—14)

This invention relates to the control of machine tools which have pattern and tracer units for moving a cutting tool in appropriate directions to cut a pattern specified contour into a workpiece. In many types of machine tools, such as lathes and boring mills, a rotatable work driver is provided to drive the workpiece. A carriage, on these types of machine tools, traverses generally across the face of the workpiece to be cut. Slidably mounted on this carriage is a tool carrying slide, which slide is positioned according to the dictates of a pattern so that the tool cuts the workpiece to the desired shape. In the past, it was often necessary to cut large amounts of metal away at one location on the workpiece and lesser amounts at a different location on the workpiece. This caused the tool to dig into the workpiece for heavy cuts and caused inaccuracies in the finished product when compared to the shape dictated by the pattern. To overcome this difficulty this invention provides an apparatus which is capable of taking one or more rough cuts, to remove excess metal, before the tool is moved according to the pattern, so that the tool, while cutting under the dictates of the pattern, may take a more uniform cut.

This invention provides a device which engages the tracer before the tracer engages the pattern, and thus holds the tool at a lesser cut than dictated by the pattern to remove the excess metal on a rough cut.

It is an object of this invention to provide a tracer controlling unit which provides for a rough cut before a template cut is made.

It is another object to provide a unit whereby several rough cuts of different lengths and of different depths may be made.

It is a further object to provide a unit which moves the tool away from the workpiece during traverse to provide tool relief.

It is another object to provide an electric circuit and appropriate controls for this unit so that the machine tool automatically cycles through one or more rough cuts and then through a pattern controlled cut.

Figure 1:
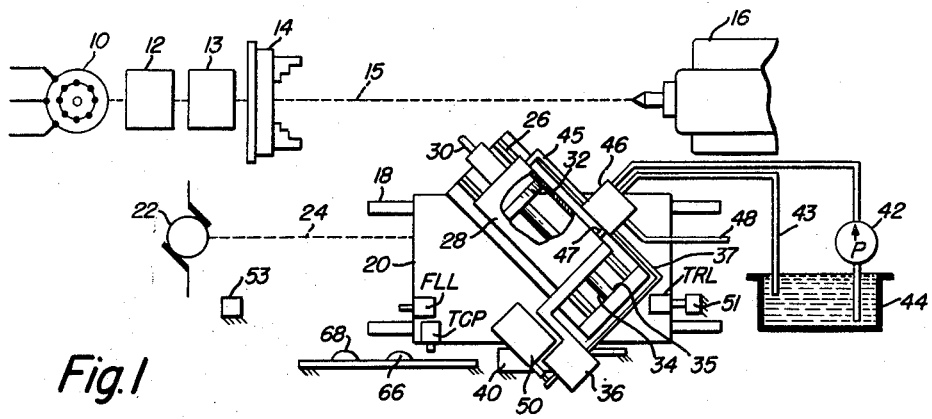
Figure 2:
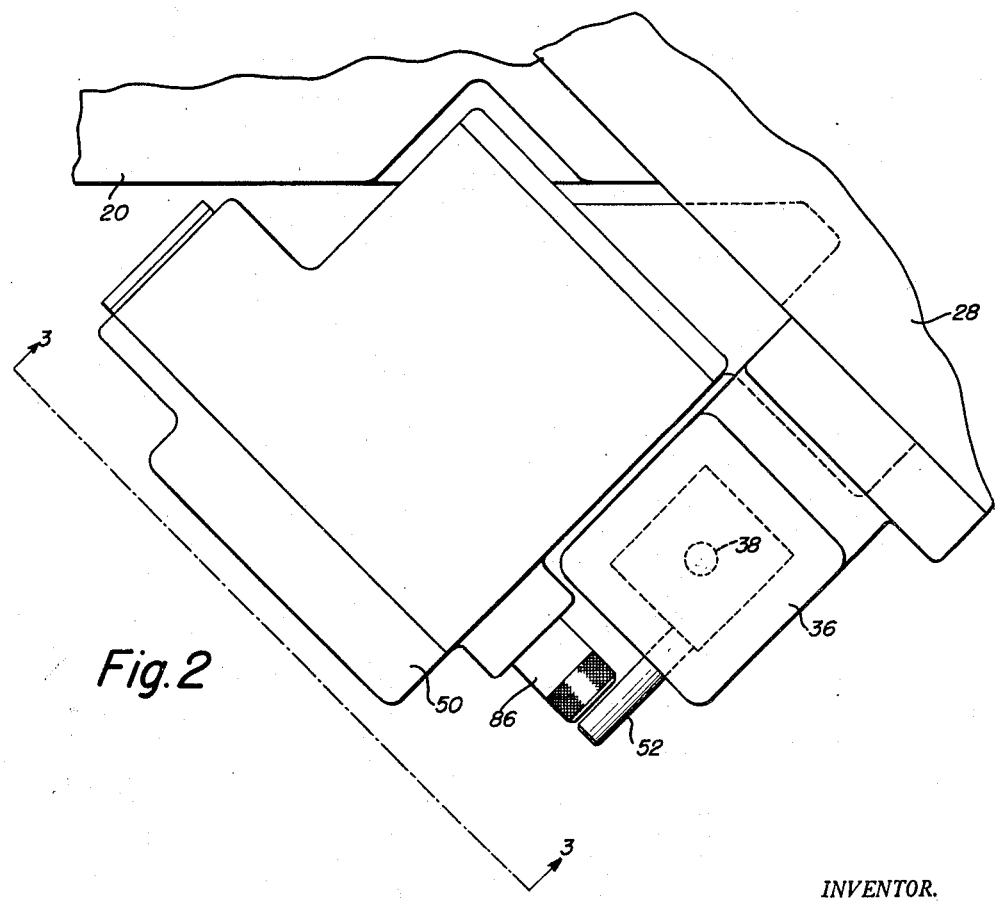
Figure 3:
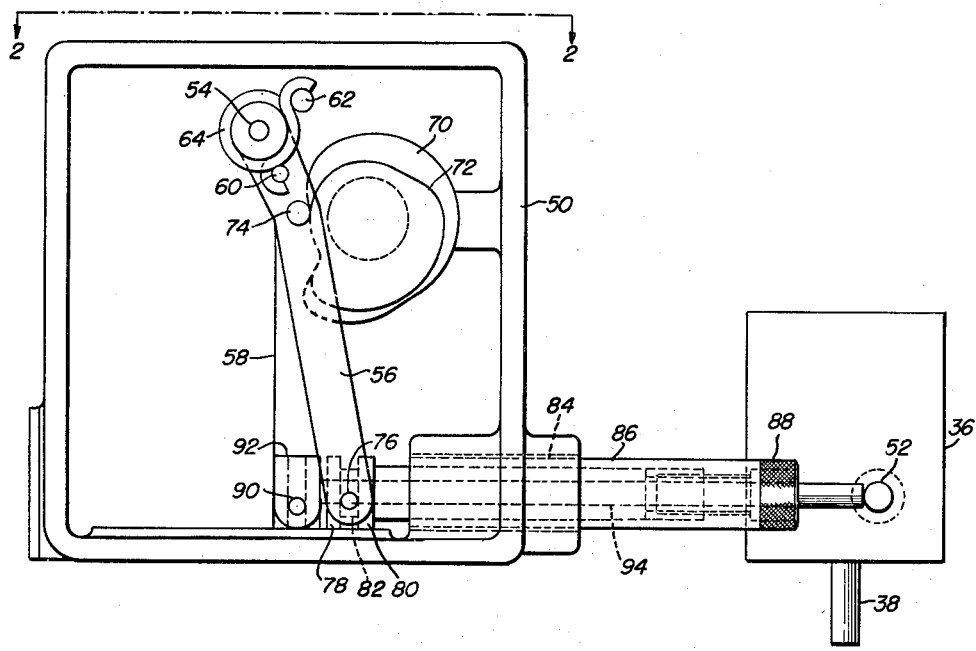
Figure 4:
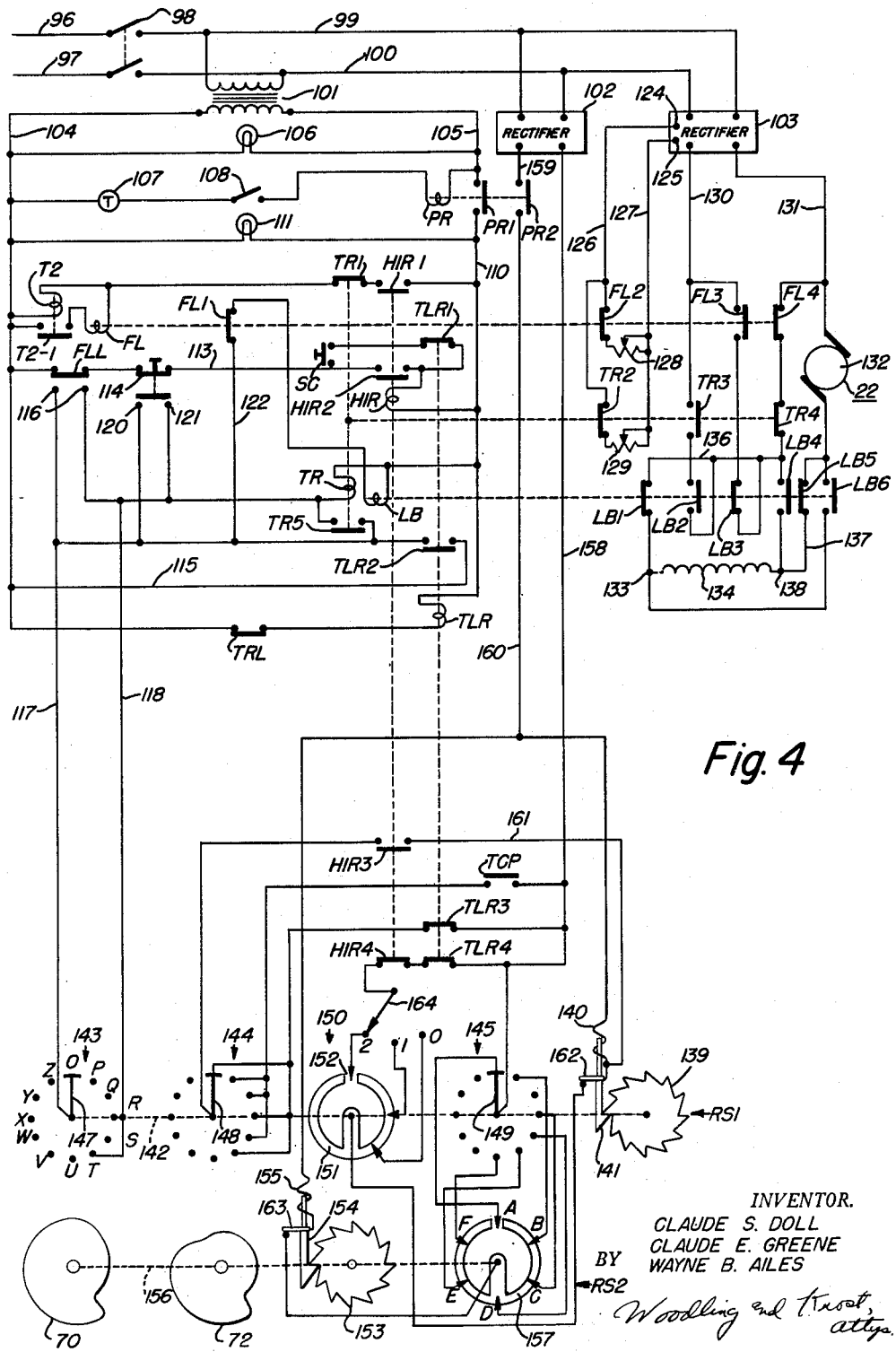

Further advantages and objects will be apparent upon reference to the exemplary embodiment of the following specifications and drawings in which:

Figure 1 is a schematic diagram of the necessary components of a lathe to show this invention as applied thereto, Figure 2 shows an enlarged top view of the unit, which is part of this invention, in its environment of Figure 1, Figure 3 shows an elevation of the unit with its side cover removed looking from the direction of arrows 3—3 of Figure 2, and Figure 4 is a schematic diagram of the electrical circuit used to control the lathe and the functions thereof.

Referring now to Figure 1, shown therein are the essential elements of a lathe. A motor 10 is provided to drive headstock 14 through clutch 12, and brake 13 is provided to stop the rotation of the headstock 14 when the clutch 12 is disengaged. A work piece may be held in the headstock 14 to rotate about work axis 15, and if necessary may be supported on the other end by the tailstock 16. Conventional ways 18 are mounted on a bed and carry the usual carriage 20 and this carriage has thereon ways 26 upon which tool holder carrying slide 28 is movably mounted. The carriage 20 is driven along its ways 18 through the agency of a drive mechanism 22. This drive may be a separate electric motor or other prime mover or it may be an appropriate controllable gear connection from headstock 14. An electric motor is illustrated. The motor 22 drives the carriage by means of a lead screw or feed rod 24.

The tool carrying slide 28 is shown as having a tool 30 affixed in a tool holder to the forward end thereof, but this tool could be carried by another slide on top of slide 28, and slide 28 may be driven along its ways by means of a hydraulic servomotor having piston 32 in a cylinder in the tool slide, by having the piston rod 34 connected to both the piston 32 and carriage 20 as at 35. This servomotor is driven by means of a pump 42 pumping hydraulic fluid out of sump 44 to a relay valve 46. Varying positions of this relay valve hold the tool slide 28 stationary on carriage 20 or make it move forward or rearward by means of connections 45 and 47 to opposite ends of the cylinder. The relay 46 is controlled by tracer 36, which tracer varies the air pressure in line 37 and which pressure controls the relay valve 46. Air pressure is supplied to the unit through line 48, and hydraulic fluid is discharged back to the sump through line 43. The tracer 36 is mounted on the tool carrying slide 28, and is adapted to cooperate with a template 40 on the bed of the lathe.

This system works similarly to the one disclosed in the application of Max De Haas et al. Serial Number 182,792, filed September 1, 1950, for Machine Tool for Automatic Cycling.

The carriage is provided with three switches FLL, TRL and TCP. Switch TRL, which is the traverse right limit switch, is arranged to be actuated by a stop 51 which is adjustably arranged on the bed; switch FLL, which is the feed left limit switch, is arranged to be actuated by adjustable stop 53; and switch TCP, which is the tracer cam positioning switch, is adapted to be actuated by adjustable abutments 66 and 68 which are mounted on the bed.

Mounted on the carriage adjacent the tracer 36 is a multiple tracer control unit having a housing 50. An enlarged view of this unit is shown in Figure 2 wherein it is seen that the unit engages an arm 52 which is attached inside the tracer housing to the same part to which is attached tracer finger 38. This tracer may be constructed in accordance with the showing of Patent Number 2,436,373.

In Figure 3 is shown side view of the tracer 36 and the control unit with the cover removed. It can be seen here that the housing 50 has a shaft 54 therein, which shaft carries thereon swingable levers 56 and 58. Each of these levers has a pin 60 therein and a pin 62 is mounted in the control unit housing. Springs 64 embrace shaft 54 and are engaged with the housing pin 62 and the pins 60 in arms 56 and 58 to urge these arms counterclockwise as viewed in Figure 3. Also journaled in the housing is a shaft carrying cams 70 and 72. The arms 56 and 58 each have a pin 74 thereon, which pins are adapted to engage cams 72 and 70, respectively. The lower end of arm 56 has a yoke carrying a pair of studs 76 thereon and these studs engage between shoulders 78 and 80 of a collar 82. Slidable in the housing at 84 is a tubular member 86 which has an adjustable head 88 thereon. Similarly arm 58 has a yoke carrying studs 90 thereon which engage between shoulders of a collar 92. This collar is attached to a member 94 which slides through the interior of member 86.

It can be seen that rotation of the cams 70 and 72 causes the arms 56 and 58 to swing about the pivot 54, which swing moves members 86 and 94 in and out of the housing 50. By properly designing the cams the extent that members 86 and 94 extend from the housing can be readily controlled and predetermined. The members 86 and 94 are adapted to engage the heretofore described pin 52 and thereby control the positioning of the tool slide 28. The tracer 36 is biased to move the top slide 28 toward the work axis, and thus it can be seen that if members 86 or 94 are thrust out of their housing 50 the tool slide 28 can come forward only until pin 52 engages one of them. By this means tracer finger 38 may be held away from template 40.

Two members 86 and 94 are provided to give more versatility in operation and adjustment. As hereinbefore noted, member 86 has an adjustable head 88 thereon. The unit housing 50 is adjustably mounted on the carriage, but member 94 has no length adjustment other than cam 70. By this arrangement setup of the cycle of operations becomes simplified. The cams 70 and 72 prescribe the cut that member 94 makes the second rough cut so the cams are turned to this position and unit housing 50 is adjusted on the carriage until the proper depth of cut is attained. Then the cams 70 and 72 are turned to the first rough cut position where member 86 determines the depth of cut. Head 88 is then adjusted until the depth is correct, thus, the depth of each cut is conveniently and easily determined.

It is thus seen that by regulating the angular position and the shape of the cams 70 and 72 that the tool may be held away from the template and work, or allowed to go into the work without going to the depth prescribed by template 40, or by retracting the extensible elements may be allowed to go to template prescribed position.

The cams are driven to any one of six positions by means of a rotary solenoid driven switch which can be electrically connected to go to any one of six positions. Such switches are commercially available under the trade name "Ledex" and are manufactured by the G. H. Leland Company of Dayton, Ohio.

Referring now to Figure 4, the aforementioned cams 70 and 72 can be seen as driven by such a switch. This figure shows a circuit which may be used to provide automatic cycling of the above equipment. Numerals 96 and 97 indicate incoming power lines which may be opened by means of disconnect switch 98. When switch 98 is closed lines 99 and 100 are energized to energize transformer 101 and rectifiers 102 and 103. Energization of transformer 101 results in a control voltage across lines 104 and 105. Connected across these lines is a red indicator lamp 106 which indicates that the control voltage is "on." Next connected across these lines is a series arrangement of a timer 107, a start switch 108, and a protective relay PR, which elements are arranged so that when start switch 108 is closed timer 107 delays completion of the circuit until the rectifiers 102 and 103 are warmed to prevent injury to the rectifiers. When switch 108 is closed timer 107 times out and the protective relay PR closes closing contact PR1 to energize line 110, this results in illumination of green lamp 111 which shows that the control circuit is ready for operation. Connected across lines 104 and 110 is a circuit containing the winding of a timer T2 which has connected in series therewith a normally closed contact TR1 of the traverse right relay and the normally open contact HIR1 of the hold-in relay HIR. Paralleled across the timer winding T2 is the coil FL of the feed left relay with the contact T2–1 of the timer T2 in series therewith.

Line 113 is connected between lines 104 and 110 through the normally closed contact of the feed left limit switch FLL, the normally closed contact 114 of the reversing switch, the normally open contact HIR2 of the hold-in relay, and the coil HIR of the hold-in relay. Paralleled across the normally open contact HIR2 is a series combination of start cycle switch SC and the traverse right limit relay contact TLR1. Also connected between lines 104 and 110 is line 115 which has therein normally open contact TLR2, normally open contacts 116 of feed left limit switch FLL and the coil of the traverse right relay TR. Paralleled across the contacts 116 of the feed left limit switch FLL are lines 117 and 118 which are hereinafter described, normally open contacts 120 and 121 of the reverse switch and normally open contact TR5 of the traverse right relay TR. Also connected to the line 117 side of switch FLL is a line 122 which contains therein a normally closed contactor FL1 of the feed left relay. In series with this contactor is the coil LB of the longitudinal brake relay and the other side of LB is connected to line 110. Also connected between lines 104 and 110 is a series combination of the traverse right limit switch TRL and the coil TLR of the traverse right limit relay.

The rectifier 103 is of the controllable type to provide current to the carriage drive motor 22. This rectifier has contacts 124 and 125 to which are connected lines 126 and 127 respectively. Connected between these lines is a series combination of a normally closed feed left relay contactor FL2 and a traverse rate potentiometer 128. Also connected across lines 126 and 127 is a series combination of a normally closed contactor TR2 of the traverse right relay and a feed rate potentiometer 129. The rectifier 103 has its output voltage to lines 130 and 131 controlled by placing one or the other of potentiometers 128 and 129 in the control circuit thereof.

Line 131 is connected through the armature 132 of motor 22 and has in series therewith normally open contact LB6 of the longitudinal brake and is connected to an end 133 of the field 134 of motor 22. End 133 is connected through normally closed contact LB1 to line 136 and this line is connected through a series combination of normally open contacts LB2 and TR3 to line 130. Also connecting line 136 to line 130 is a series combination of normally closed contact LB3 and normally open contactor FL3. Connected between LB6 and armature 132 is a line 137 which has normally closed contact LB5 therein. This line is connected to the other end 138 of the field 134. A line is connected at 138 and goes through normally open contact LB4 and is there connected to line 136, and then goes through normally closed contacts TR4 and FL4 to line 131.

The above described circuit controls and is controlled by a rotary switch RS1, and this switch in turn controls a rotary switch RS2. Rotary switch RS1 is shown as having a ratchet wheel 139 which is operated by a solenoid 140 operated pawl 141. A shaft 142 is driven by switches 143, 144, and 145. These switches each have 12 contacts O through Z and arms 147, 148, and 149, respectively. The arms carry on their extremities contacts which are engageable with any one of the contact points O to Z when they are in one of their 12 positions, and when they move from one position to the next these contacts momentarily engage two adjacent contact points. Also driven by shaft 142 is a different type of switch. This switch is shown at 150 and has thereon conductor strip 151 which extends nearly around the periphery of the switch. It is interrupted at one point 152 by insulation material. Rotary switch RS2 is similar to RS1 in that it has a ratchet wheel 153 driven by pawl 154 and this pawl is actuated by solenoid 155. Wheel 153 drives a shaft 156 which carries the cams 70 and 72 thereon and also carries a switch disc 157 which is similar to switch disc 150. Rotary switch RS2 has six positions designated A through F. These positions are also shown on cams 70 and 72 in Figure 3.

These switches are supplied with power from rectifier 102 through lines 158 and 159. When the protective relay contact PR2 is closed, line 160 is energized and this line is connected to one end of each of the solenoids 140 and 155. The other side of solenoid 140 is connected through line 161 and normally open contactor HIR3 to the arm 148 of switch 144. These solenoids 140 and 155 are provided with switches 162 and 163 respectively which open when the solenoid is energized. One side of switch 162 is connected to the end of the coil 140 which is connected to line 161. The other side of switch 162 is connected to the conductor strip 151 of switch 150. Switch 163 is connected to the other end of solenoid 155, and the other side of this switch is connected to the conductor strip of switch 157.

Line 158 is connected through the tracer cam positioning switch TCP to contacts P, Q, and S of switch 144. Line 158 is also connected through normally closed contact TLR3 of the traverse right limit relay and thence to points O, R, and T of the switch 144. Line 158 is connected to the arm 149 of switch 145 and also through the series combination of normally closed contacts TLR4 and HIR4 to a selector switch 164. This selector switch can select any one of three positions identified as zero, 1, and 2. The contact point zero is connected to contact point T of the switch 150, the contact 1 is connected to point R of the switch 150, and contactor 2 is connected to the point O of the switch 150. The aforementioned line 117 is connected to arm 147 of switch 143, and the line 118 is connected to points R and T of this switch.

Point O of switch 145 is connected to point A of switch 157, point P of switch 145 is connected to point B of switch 157, point R of switch 145 is connected to point C of switch 157, point S of switch 145 is connected to point D of switch 157, point T of switch 145 is connected to point E of switch 157, and point U of switch 145 is connected to point F of switch 157.

The above description describes the details of a machine and electric circuit which controls the operation of the machine. The machine is shown at rest in a position where a workpiece may be loaded therein and the electric circuit is shown in the de-energized state, and all relay actuated contacts are shown in a position they would assume if their respective relays were not energized.

Operation

In operating the machine the operator would first close disconnect switch 98 which energizes the transformer 101 and rectifiers 102 and 103. Lines 104 and 105 of the control circuit are now energized to illuminate red light 106. Next the operator would close start switch 108, which after suitable interval dictated by timer 107 would energize protective relay PR and close contactors PR1 and PR2 thereof. This action would energize lines 110 and 160. It will be seen from an inspection of Figure 1 that the traverse right limit switch TRL is open for the carriage in its right most position and thus relay TLR is not energized. It will be seen that line 158 is connected through closed contacts TLR4 and HIR4 to the selector switch 164, and that this switch completes circuit to the contact 2 thereof. Thus if the rotary switch RS1 were not in the position shown, a circuit would be completed through 151 and 162 causing the rotary switch to ratchet around to this position. This position is the position shown in Figure 3 wherein the cam 70 allows member 94 to move out to its furthermost position, thus moving the tool 30 substantially away from the work area. This is the loading position for putting a new workpiece into the machine.

It is assumed that the operator now starts the drive motor 10, the hydraulic pump 42, supplies air through line 48, and regulates the clutch and brake 12 and 13 to hold the headstock still while he loads a workpiece, and then starts the rotation of the headstock. The machine is now ready for automatic cycle operation and the operator starts this operation by depressing start cycle button SC. Depressing SC energizes HIR and closes HIR2 as a holding circuit therefor. Actuation of HIR closes contactor HIR1 thereof which energizes timer T2. HIR4 opens, and HIR3 closes completing circuit through the solenoid coil 140 of rotary switch RS1, but not through switch 162, thereby causing one pulse of the pawl 141, to turn the contact arms of this switch to position P. This movement closes a circuit through arm 149 to contactor B of switch 157 of rotary switch RS2. This circuit causes ratcheting of pawl 154 until the cams and switch 157 are in position B, which is a first rough cut position of the members 86 and 94. The slide 28 comes forward until the pin 52 engages one of the members 86 and 94, and at this time timer T2 times out closing the circuit through the feed left relay FL. Actuation of FL opens FL1 and prevents the longitudinal brake relay LB from being actuated. Its actuation also opens FL2 which leaves only the feed left potentiometer 129 in the circuit to control the rectifier to put feed voltage across the lines 130 and 131. Actuation of FL closes contactor FL3 and opens contactor FL4 so that there is a circuit from 130 through FL3 and LB3 to line 136, and thence the current flows through LB1, the field 134 from the left to right, as viewed in the drawings, through LB5 and through armature 132 to line 131, thus causing the motor 22 to run in an appropriate direction and speed for feeding the tool along the work.

Switch TCP will be actuated by abutment 66. This causes energization of the solenoid 140 for one impulse which advances the rotary switch RS1 to contact point Q. This movement of RS1 does not turn RS2 for the contact point Q of switch 145 is not connected to RS2. Feed left continues with the cams still in position B.

Switch TCP then is actuated by abutment 68. This completes a circuit through line 161 to pulse the solenoid 140 to move the switch RS1 to position R. This movement positions arm 149 on contact point R of switch 145 which completes a circuit to point C of switch RS2 to move RS2 and cams 70 and 72 to this position. This cam movement thrusts out one of members 94 or 86 to move the tool slightly away from the workpiece for tool relief. The movement of RS1 also completes the circuit between lines 117 and 118 through switch 143. This latter circuit actuates traverse right relay TR through contact TLR2, and TR closes a holding circuit for itself at TR5. TR1 opens, dropping out the feed left relay, and opens contacts TR2, TR4, and closes contact TR3. This results in putting traverse rate potentiometer 128 in the rectifier 103 control circuit, and the removal of the feed rate potentiometer 129. Traverse rate voltage is now applied to the lines 130 and 131. It also should be noted that when the longitudinal brake relay LB is actuated through FL1, a current then flows from line 130 through TR3 and LB2 to line 136 and thence through LB4, from right to left through field 134, through LB6 and armature 132 to line 131, thereby reversing the motor to drive the carriage right at a traverse rate.

As the carriage traverses right, switch TCP passes over abutment 66, but RS1 is not advanced for there is no connection between the TCP line and the arm 148 of switch 144.

When the carriage reaches its right-most position the traverse right limit switch TRL is actuated dropping out traverse right limit relay TLR. This operation opens contact TLR2 which drops out relay TR, thus closing contacts TR1, TR2 and TR4. At this point the motor 22 is dynamically braked by connecting the field 134 reversely in series with the armature 132, as is hereinafter described. Closure of TR1 results in the actuation of the timer T2. Drop out of TLR results in the closing of contact TLR3, which completes a circuit through arm 148 and HIR3 to pulse RS1 to position S on switch 145. This closes a circuit from contact point D of RS2 and thus moves RS2 and associated cams 70 and 72 to position D which provides for another rough cut. The tool moves forward powered by the servomotor, to a new position as dictated by cams 70 and 72. At this point timer T2 times out closing contact T2–1 thereof and thus energizes the feed left relay FL. The operation with the switches in this position has been heretofore described, so it is felt that it is not necessary to repeat it here. The carriage feeds left making a second rough cut until switch TCP hits abutment 66.

The depression of TCP creates a circuit through arm 148 of switch 144 and HIR3 to advance RS1 to position T. This moves RS2 to position E, which position provides tool relief by moving the tool away from the workpiece. A circuit is completed across lines 117 and 118 again to actuate the traverse right relay TR, which, in the above described manner, traverses the carriage right until the traverse right limit switch TRL is depressed. Opening TRL readys the circuit for another feed left and again brakes the motor 22, and closure of TLR3 advances RS1 to position U, by means of the arm 148 in switch 144. Movement of RS1 to position U causes movement of RS2 to position F, which movement retracts the members 86 and 94 out of the way of pin 52 so that the tool slide 28 can advance until the tracer finger 38 hits the pattern 40. Again the timer T2 times out to cause feed left relay FL to pull in, and thus the carriage again feeds left with the tool moving under the dictates of the pattern 40. When TCP is depressed as it passes over abutments 66 and 68, RS1 is not advanced because the contacts U through Z of switch 144 are not connected with the solenoid 140 in any manner.

Feed left along the template continues until the feed left limit switch FLL opens its upper contacts to drop out HIR and closes its lower contacts to energize TR. Traverse right then occurs and continues until traverse right limit switch TRL is opened causing drop out of TLR, whereupon the motor 22 is again braked. This situation completes the circuit from line 158 through TLR4 and HIR4 to selector switch 164 which, when in position shown, causes RS1 to move around to position O, and this causes RS2 to move around to the position A, or work loading position.

It should be noted that each time the carriage moves right and hits the traverse right limit switch TRL that both traverse right relay TR and feed left relay FL are de-energized and this causes momentary braking through the longitudinal brake circuit controlled by relay LB. When both TR and FL are de-energized, the field 134 of the motor is in a complete series circuit with the armature 132 causing dynamic braking thereof. Actuation of LB reverses the series relationship.

The selector switch 164 may be used to determine the number of rough cut cycles that will be performed by this unit. As described, the position 2 allows for two rough cuts and then a template cut. If the switch 164 were set on contact 1 the cycle would start with RS1 at position R and RS2 at position C, and thus only a single rough cut would be accomplished. Similarly if this switch were set to zero position the cycle would start at position T and the first cut would be a pattern dictated cut.

While this invention has been described in very specific terms in the above specification and the drawings, it is believed that the inventive concept disclosed herein may be used in other embodiments and thus it is wished that this invention be not limited to this specific embodiment, but to the structure described in the appended claims.

What we claim is:

1. In a machine tool having a carriage movable on a bed, a tool holder carrying slide slidably mounted on the carriage and a pattern controlled tracer controlling a servomotor for moving the slide relative to the carriage, means for providing relative movement between said pattern and tracer in accordance with the relative movement between said slide and said bed, said tracer and said carriage being relatively movable along a given path, additional means for controlling the slide movement comprising a unit mounted on the carriage, a cam in said unit, a member connected to said cam movable into a position whereat the tracer engages the member before the tracer engages the pattern to determine a position of the slide independent of the pattern, motive means to turn the cam, and means responsive to the carriage position to actuate said motive means.

2. In a pattern and tracer controlled machine tool, a bed, a carriage slidable on said bed, means to drive said carriage along said bed, a tool holder carrying slide slidably mounted on the carriage, a servomotor drivingly connected between said carriage and said slide, a pattern, a tracer connected to said servomotor for control thereof, means for providing relative movement between said pattern and tracer in accordance with the relative movement between said slide and said bed, said tracer and said pattern being relatively movable and engageable in a given plane, said tracer and said carriage being relatively movable along a given path, a movable cam on said carriage, a cam driver connected to said cam, means connected to said cam driver and responsive to the carriage position to actuate said cam driver, a member movably mounted on said carriage and engageable with said tracer, said member being operatively connected to said cam so that its movement is responsive to cam movement, said member having one position in said given path whereat the tracer engages the member and does not engage the pattern, and another position whereat the tracer engages the pattern and does not engage the member.

3. The structure of claim 2 wherein said cam driver is an electric drive means, and the direction of movement of said slide is acutely angular to the direction of movement of said carriage.

4. In a machine tool having a bed, a carriage slidable on the bed, a tool holder carrying slide slidably mounted on the carriage, a servomotor connected to the slide to move it on its mounting, a tracer movable with said slide and controlling the servomotor, and a pattern mounted on the bed for engagement by the tracer, said tracer and said carriage being relatively movable along a given path, the improvement comprising electric drive means mounted on the carriage, first and second cams driven by said drive means, first and second members positioned by said cams, said first and second members being individually movable to positions on said given path whereat they selectively hold said tracer away from the pattern so that the tool holder carrying slide is held in a rough cut position, and means responsive to the carriage positions to actuate said drive means to move said cams and said members.

5. In a machine tool having a carriage, a servomotor powered tool holder carrying slide on the carriage, and a tracer controlling the servomotor, said tracer and said carriage being relatively movable along a given path, the provision of first and second cams on the carriage, means to drive said cams, first and second members driven by said first and second cams, respectively, said members being individually movable to a position on said given path for engagement with the tracer, and means to actuate said drive means so that said first member is moved out of a position where it may be engaged by the tracer and said second member is engageable by the tracer.

6. In a machine tool having a bed, a carriage movable on the bed, a tool holder carrying slide slidably mounted on the carriage and a tracer controlled servomotor for moving the slide, said tracer and said carriage being relatively movable along a given path, the provision of a unit mounted on the carriage, a cam in the unit, motive means connected to the cam to drive it, a movable member driven by the cam to assume various positions with respect to the carriage which positions are determined by the cam position, a pattern on the bed, said movable member having one position in said given path whereat the tracer engages the member and another position whereat the tracer engages the pattern, and means responsive to the carriage position connected to said motive means to move said movable member from its one position to its other position.

7. In a machine tool having a carriage movable along a bed, a tool holder carrying slide slidably mounted on the carriage, a pattern mounted on the bed, and a tracer controlled servomotor connected to the slide for moving it, said tracer and said carriage being relatively movable along a given path, the provision of a housing mounted on the carriage, a shaft rotatably mounted in the housing, a cam mounted on the shaft, another cam, means to drive the cams, and separate members extending from the housing driven by each cam, the rotary position of the cams determining the amount of extension of the members from the housing, said members being adapted to individually engage the tracer, so that in one position of the cams one of the members is within said given path to engage the tracer, and in another position of the cams both members are positioned so that the tracer engages the pattern.

8. In a machine tool having a carriage, a servomotor-powered tool holder carrying slide on the carriage, a tracer controlling the servomotor, said tracer and said carriage being relatively movable along a given path, the provision of rotatable means on the carriage, means to drive said rotatable means, first and second members driven by said rotatable means, said members being individually movable to a position on said path for engagement with said tracer, and means to actuate said drive means so that said first member is moved out of a position where it may be engaged by the tracer and said second member is engageable by the tracer.

9. In a pattern and tracer controlled machine tool, a bed, a carriage slidable on said bed, means to drive said carriage along said bed, a tool holder carrying slide slidably mounted on the carriage, a servomotor drivingly connected between said carriage and said slide, a pattern, a tracer connected to said servomotor for control thereof, means for providing relative movement between said pattern and tracer in accordance with the relative movement between said slide and said bed, said tracer and said pattern being relatively movable and engageable in a given plane, said tracer and said carriage being relatively movable along a given path, rotatable means on said carriage, drive means connected to said rotatable means, means connected to said drive means and responsive to the carriage position to actuate said drive means, a member movably mounted on said carriage and engageable with said tracer, said member being operatively connected to said rotatable means to be movable therewith, said member having one position in said given path whereat the tracer engages the member and does not engage the pattern, and another position whereat the tracer engages the pattern and does not engage the member.

References Cited in the file of this patent

UNITED STATES PATENTS

| | | |
|---|---|---|
| 1,950,332 | Von Pechmann | Mar. 6, 1934 |
| 2,011,086 | Shaw | Aug. 13, 1935 |
| 2,029,335 | Oberhoffken | Feb. 4, 1936 |
| 2,375,831 | Turchan | May 15, 1945 |
| 2,540,323 | Cross | Feb. 6, 1951 |
| 2,695,543 | Von Zelewsky | Nov. 2, 1954 |

FOREIGN PATENTS

| | | |
|---|---|---|
| 243,521 | Switzerland | July 15, 1946 |